(12) United States Patent
Deng et al.

(10) Patent No.: US 6,493,176 B1
(45) Date of Patent: Dec. 10, 2002

(54) DISK DRIVE WITH VARIABLE TPI SERVO TRACKS

(75) Inventors: Youping Deng, Sunnyvale, CA (US); Lin Guo, Milpitas, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/556,709

(22) Filed: Apr. 24, 2000

(51) Int. Cl.⁷ .............................................. G11B 5/596
(52) U.S. Cl. .............................. 360/78.05; 360/78.08; 360/48
(58) Field of Search ...................... 360/78.05, 77.08, 360/77.02, 51, 75, 78.12, 77.04, 48

(56) References Cited

U.S. PATENT DOCUMENTS

| | | | |
|---|---|---|---|
| 5,189,578 A | | 2/1993 | Mori et al. ............... 360/106 |
| 5,223,993 A | * | 6/1993 | Squires et al. ........... 360/77.08 |
| 5,272,578 A | * | 12/1993 | Diau ....................... 360/96.5 |
| 5,293,282 A | * | 3/1994 | Squires et al. ........... 360/77.08 |
| 5,303,105 A | | 4/1994 | Jorgenson ................ 360/106 |
| 5,339,204 A | * | 8/1994 | James et al. ............. 360/51 |
| 5,448,429 A | * | 9/1995 | Cribbs et al. ............ 360/75 |
| 5,521,778 A | | 5/1996 | Boutaghou et al. ....... 360/106 |
| 5,570,241 A | | 10/1996 | Nielson et al. ........... 360/46 |
| 5,570,247 A | * | 10/1996 | Brown et al. ............. 360/75 |
| 5,659,436 A | * | 8/1997 | Yarmchuk et al. ........ 360/75 |
| 5,668,679 A | * | 9/1997 | Swearingen et al. ...... 360/75 |
| 5,796,542 A | * | 8/1998 | Szeremeta ............... 360/77.02 |
| 5,856,896 A | | 1/1999 | Berg et al. ............... 360/104 |
| 5,875,064 A | * | 2/1999 | Chainer et al. ........... 360/75 |
| 5,901,010 A | * | 5/1999 | Glover et al. ............ 360/78.12 |
| 5,907,447 A | * | 5/1999 | Yarmchuk et al. ........ 360/75 |
| 5,920,441 A | | 7/1999 | Cunningham et al. .... 360/78.05 |
| 5,949,603 A | * | 9/1999 | Brown et al. ............. 360/75 |
| 6,040,955 A | * | 3/2000 | Brown et al. ............. 360/75 |
| 6,049,440 A | * | 4/2000 | Shu ........................ 360/77.04 |
| 6,256,160 B1 | * | 7/2001 | Likanen et al. .......... 360/48 |

OTHER PUBLICATIONS

U.S. Application Ser. No. 09/073,600, filed May 6, 1998, entitled "Parallel Servo with Ultra High Bandwidth Off–Track Detection," and assigned to the assignee of the present invention.

U.S. Application Ser. No. 09/388,512, filed Sep. 2, 1999, entitled "Method and Apparatus for Performing a Flaw Scan of a Disk Drive," and assigned to the assignee of the present invention.

* cited by examiner

Primary Examiner—David Hudspeth
Assistant Examiner—Fred F. Tzeng
(74) Attorney, Agent, or Firm—David M. Sigmond

(57) ABSTRACT

The present invention is directed to utilizing the capabilities of multi-stage actuators in disk drives to write servo tracks that have a variable number of tracks-per-inch (TPI) from head to head, thereby improving both the performance of the drive and manufacturing yields. An appropriate TPI for a particular head has been found to depend on a number of factors that vary from head to head. Consequently, the initial step is to determine an appropriate TPI for at least one of the heads or, more preferably, all of the heads in the drive. The determination typically involves measurements such as read and write width measurements and off-track performance tests for the relevant heads. Once an appropriate TPI format has been determined, the servo tracks are written according to the TPI formats using either a servo track writer or self servo track writing.

60 Claims, 4 Drawing Sheets

DISK DRIVE WITH VARIABLE TPI SERVO TRACKS

FIELD OF THE INVENTION

The present invention relates to disk drives and, in particular, to the writing of servo tracks on a disk within the disk drive.

BACKGROUND OF THE INVENTION

A disk drive is a device that is commonly employed in computer systems to store data. Typically, a disk drive includes: (1) one or more disks that each have a plurality of concentric tracks on which data is stored; (2) a spin motor for rotating the disk or disks; (3) one or more heads that are each capable of writing and/or reading data to/from a track on a disk; (4) an actuator for moving the head or heads to a desired location adjacent to a disk so that data can be written to the disk or read from the disk; and (5) circuitry for transferring data between a disk and a portion of a host computer system that is exterior to the disk drive, such as a random access memory (RAM).

A disk drive also typically includes a servo system that operates to move a head over a defined track on a disk surface and maintain the head over the defined track until directed to move the head over a different track. The servo system maintains the position of the head over a defined track based upon information that is read from a servo track. In one type of drive, the servo tracks are embedded in or coincident with the user data tracks, i.e., the servo track and the user data track form a single physical track with the servo data interspersed among the user data. Typically, the servo track: (1) identifies the particular track over which a head is positioned; and (2) provides data from which the position of the head relative to the center line of the track can be determined. The identification of the particular track is primarily used when the head is being moved from one track to another track (which is commonly known as a seek operation) to determine when the head is positioned over the desired track. Once the head is over the desired track, the data indicating the position of the head relative to the center line of the track is determined and used to maintain the head over the desired track (which is commonly known as a tracking operation). For example, if the data indicates that the head is positioned to one side of the center line, the servo system causes the actuator to move the head towards the center line.

Presently, the servo tracks are written on the disk surfaces of a disk drive during the manufacturing process by a servo track writer. The servo track writer uses a "push pin" to move the actuator arm and thereby position the heads for writing the servo tracks. To elaborate, the servo track writer uses the "push pin" to move the actuator and, as a consequence, position the heads for the writing of first servo tracks (one per disk surface). Once the first servo tracks have been written, the servo track writer uses the "push pin" to move the actuator and thereby reposition the heads for the writing of the second servo tracks. This process is repeated until all of the servo tracks have been written. As an alternative to using a servo track writer, the drive itself can be used to write the servo tracks in what is known as self servo writing. In this case, a motor associated with the actuator is used to move the actuator arm in discrete steps to write each servo track. In either case, for at least a band or section of contiguous tracks, the heads are either: (1) moved such that the arc that the heads move through from one track to the next track is substantially equal, which results in the track density changing over the band of tracks and is known as the "equal-arc drive format"; or (2) moved such that the distance between adjacent tracks remains substantially constant over the band of tracks, which is known as the "equal-length drive format."

Regardless of whether a servo track writer or self servo writing is used to establish the servo tracks in a drive or the track format (equal-arc or equal-length) used, the track density measured in tracks per inch (TPI) at a give radius is the same for all of the disk surfaces in the drive.

SUMMARY OF THE INVENTION

The present invention recognizes that the optimal servo track density at a given radius can vary from disk surface to disk surface within the drive and that the present methods of writing servo tracks do not provide for writing the servo tracks on different disk surfaces with different densities at a given radius. The present invention is directed to using a multi-stage actuator within the drive to write servo tracks on two or more disk surfaces within a drive with the track density on each surface at a given radius approaching the optimal track density for that surface. The multi-stage actuator includes a primary actuator for coarsely positioning a head and a secondary actuator for finely positioning the head.

In one embodiment, a disk drive includes at least two separate and substantially parallel disk surfaces that are capable of storing data. Associated with each disk surface is a head for transferring data between the disk surface and the exterior environment. A multi-stage actuator is used to move the heads to desired positions over the disk surfaces for the transfer of data. The multi-stage actuator includes a primary actuator for coarsely positioning the heads relative to the disk surfaces. Associated with each head is a secondary actuator that permits the position of the head to be more finely controlled. The data transfer circuitry of the disk drive, which is normally used to write/read user data to/from the disk, is also adapted to write the servo tracks on the track surfaces. Initially, the tracks per inch (TPI) format that is appropriate for each disk surface on which servo tracks are to be established is determined. While the TPI format may be the same for each disk surface, it is more likely that the TPI format will be at least slightly different for each disk surface. Typical measurements from which the TPI format for a particular surface is determined include the read head width, the write head width and off-track performance based upon a bit error rate and read channel quality factor. Once the TPI format for each disk surface has been determined, the primary actuator is used to position each of the heads for the writing of the first servo track on each of the disk surfaces. The secondary actuators are also used to position each of the heads for the writing of the first servo tracks. Once the heads have been positioned, the first servo tracks are written on each of the disk surfaces. After the first servo tracks are written, the heads are repositioned to write the second set of servo tracks on the disk using the secondary actuators. Because the secondary actuators are capable of operating independently of one another, a different TPI format can be implemented for each disk surface. Once most or all of the servo tracks that can be written for a given position of the primary actuator by using the secondary actuators to move the heads have been written, the primary actuator is repositioned and the process is repeated.

In one embodiment, the position of the actuator arm that carries the heads is adjusted using the actuator motor in a self servo writing operation. In this case, the actuator motor is used to position the actuator arm associated with the primary actuator.

In another embodiment, the position of the primary actuator and, more specifically, the actuator arm that carries the heads (as is part of the primary actuator) is adjusted by a servo writer. In this case, a "push pin" associated with the servo track writer contacts the actuator arm and pushes the arm such that the heads are positioned over the desired locations on the disk surfaces.

DETAILED DESCRIPTION

Figure 1A:
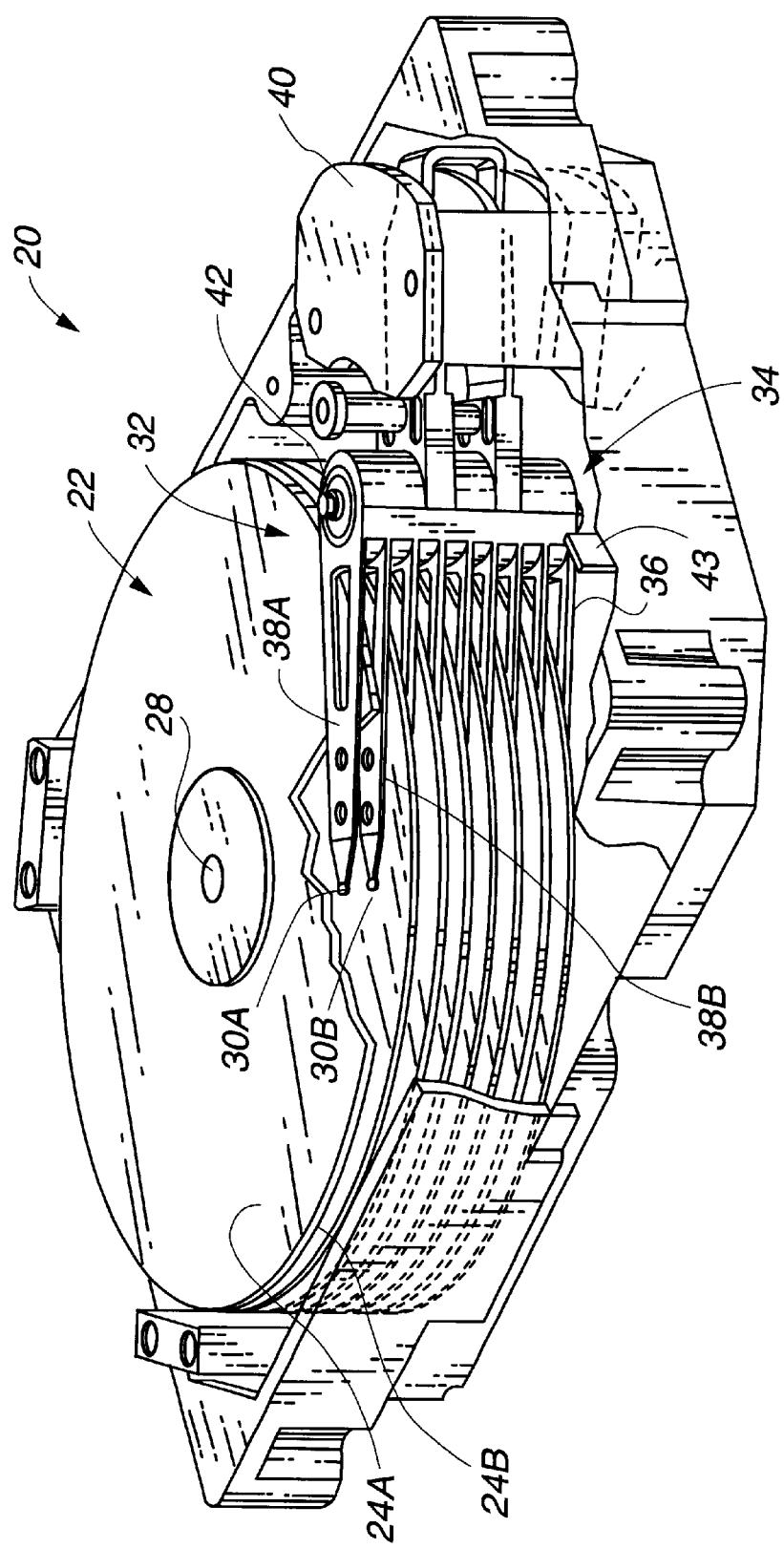
FIG. 1A illustrates a typical disk drive with a multi-stage actuator.
Figure 1B:
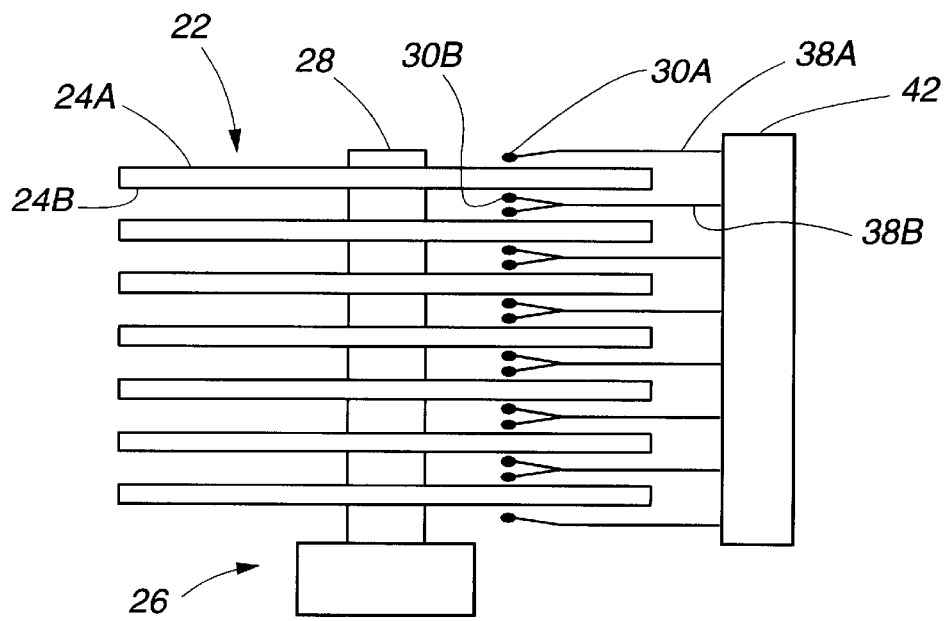
FIG. 1B is a functional side view of certain components in the drive illustrated in FIG. 1A.

FIGS. 1A and 1B illustrate a typical disk drive 20 that includes a plurality of disks. To simplify the description of the invention, it is only necessary to consider a single magnetic disk 22. It should, however, be appreciated that the invention is adaptable to disk drives that include multiple disks. The disk 22 is capable of storing data in concentric tracks located on a first surface 24A and a second surface 24B of the disk 22. A spin motor 26 is used to rotate the disk 22 about a central axis 28 at a substantially constant rotational velocity.

A first head 30A is provided for transferring data between the first surface 24A of the disk 22 and the exterior environment. Similarly, a second head 30B is provided for transferring data between the second surface 24B of the disk 22 and the exterior environment. The first and second heads 30A, 30B each include a write element for writing data to the disk 22 and a read element for reading data from the disk 22.

To position the first and second heads 30A, 30B over the tracks on the first and second surfaces 24A, 24B of the disk 22 so that data can be transferred, a multi-stage actuator 32 is provided. Included in the multi-stage actuator 32 is a primary actuator 34 for coarsely positioning the first and second heads 30A, 30B over desired locations on the first and second surfaces 24A, 24B of the disk 22. The primary actuator 34 is comprised of a carriage 36 that includes first and second arms 38A, 38B for holding, respectively, the first and second heads 30A, 30B. Typically, the first and second arms 38A, 38B each include a rigid portion and a flexible, suspension portion. The suspension portion is located between the head and the rigid portion. A voice coil motor 40 is provided for rotating the first and second arms 38A, 38B about an axis 42. To prevent the primary actuator 34 from moving the heads beyond the outer edge of the disks and contacting the interior of the disk housing (not shown), a crash stop 43 is provided.

Figure 2:
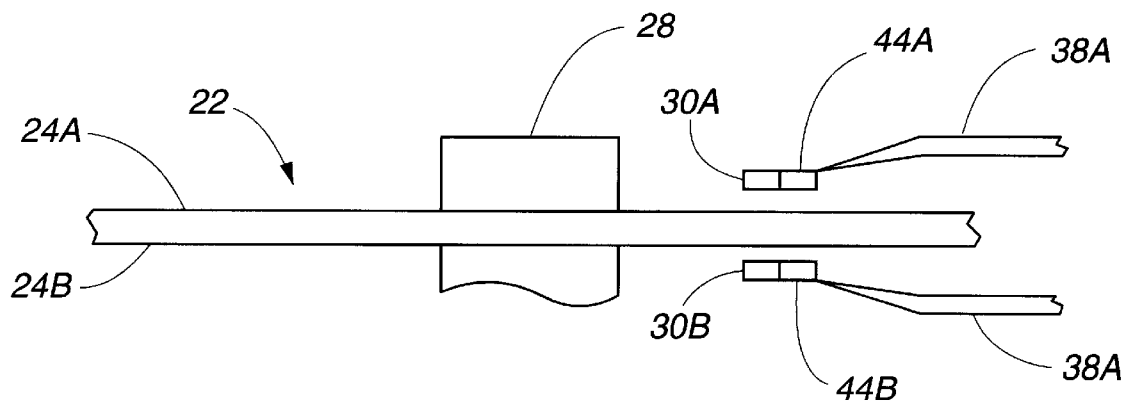
FIG. 2 is a functional diagram that shows the secondary actuators that are used to finely position heads relative to the disk surfaces.

With reference to FIG. 2, the multi-stage actuator 32 includes secondary actuators 44A, 44B for fine positioning of, respectively, the first and second heads 30A, 30B. The two secondary actuators are independently controllable. Independent control allows one of the secondary actuators to be implementing a seek operation with one of the heads (i.e., moving a head from one track to another track) while the other secondary actuator is implementing a tracking operation with the other head (i.e., maintaining the position of the other head over a desired track). Further, independent control permits each of the secondary actuators 44A, 44B to be simultaneously implementing either a tracking function or a seeking function. For purposes of the description, the secondary actuators 44A, 44B are both rotary types of actuators. An example of such a secondary actuator can be found in U.S. Pat. No. 5,521,778. It should, however, be appreciated that the invention is equally applicable to a disk drive that uses a secondary actuator that moves a head in a linear manner.

Figure 3:
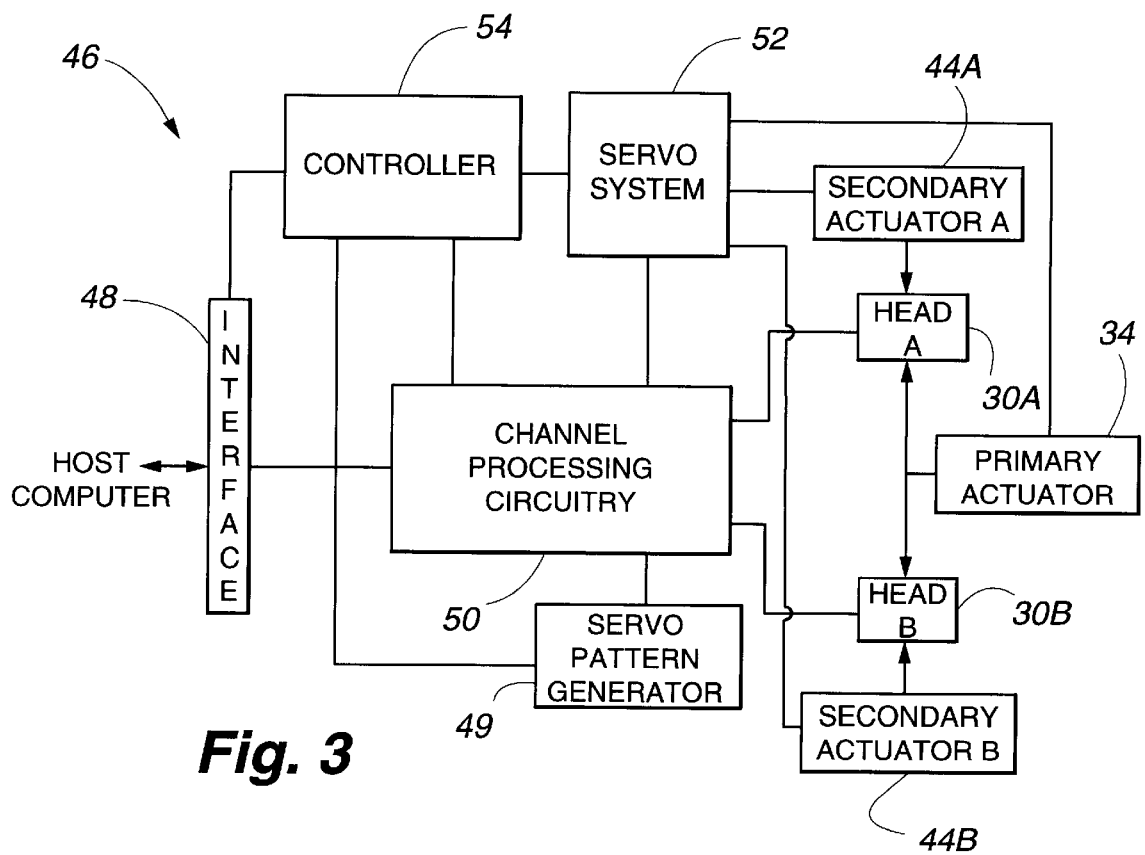
FIG. 3 is a function block diagram of certain elements of the disk drive that are used in self servo writing.

The disk drive 20 further includes a data transfer device that operates in conjunction with the multi-stage actuator 32 to write servo tracks on the disk 22. With reference to FIG. 3, an embodiment of the data transfer device 46 is illustrated that operates to: (1) use the primary actuator 34 and secondary actuators 44A, 44B to position the first and second heads 30A, 30B for the writing of servo tracks on the disk 22; (2) write the initial servo track on the first surface 24A of the disk 22; (3) use the initial servo track as a reference for writing one or more servo tracks on the second surface 24B of the disk 22; (4) use a servo track written on the second surface 24B of the disk 22 as a reference for writing further servo tracks on the first surface 24A of the disk adjacent to the initial servo track; (5) use a servo track, other than the initial servo track, written on the first surface 24A of the disk 22 as a reference for writing further servo tracks on the second surface 24B of the disk 22; and (6) repeat steps (4) and (5) until all of the servo tracks have been written on the first and second surfaces 24A, 24B of the disk 22.

The device 46 includes some, if not all of the circuitry normally used to read and write user data to and from the disk 22. Specifically, the device 46 includes an interface 48 that is capable of transferring data between the disk drive 20 and the exterior environment (typically, a host computer). The device 46 also includes a servo pattern generator 49 for providing the servo data that is written to the disk 22.

The data transfer device 46 also includes channel processing circuitry 50 that is normally used to process and/or manage user data that is to be written to the disk 22 by one of the heads 30A, 30B and that has been read from the disk by one of the heads 30A, 30B. For writing servo tracks on the disk 22, the channel processing circuitry 50 is capable of: (1) processing and/or managing servo data that is read from a servo track on the disk 22 by one of the heads 30A, 30B and providing the servo data to a servo system; and (2) while the servo data is being read and provided to a servo system, write a servo track to the disk 22 using one of the heads 30A, 30B and servo data provided by the servo pattern generator 49.

The data transfer device 46 further includes a servo system 52 that is normally used in the writing of user data to: (1) control the primary actuator 34 to coarsely posit first and second heads 30A, 30B at a desired location over, respectively, the first and second surfaces 24A, 24B of the disk 22; and (2) control the secondary actuators 44A, 44B to finely position the first and second heads 30A, 30B, respectively. For the purpose of writing servo tracks, the servo system 52 serves the same functions with the only difference being that servo data and timing data rather than user data is written to the disk 22. The servo system 52 is susceptible to a number of different approaches, including the parallel loop, master-slave loop, dual feedback loop, master-slave with decoupling approaches.

The data transfer device 46 further includes a controller 54 for coordinating the operation of the interface 48, servo pattern generator 49, channel processing circuitry 50, and servo system 52. With respect to the servo system 52, the controller 54 operates to identify the tracks that the primary actuator 34 and each of the secondary actuators 44A, 44B should either be moving the heads 30A, 30B towards (i.e., seeking) or following (i.e., tracking). As is seen, the controller 54 is connected to the interface 48, servo pattern generator 49, channel processing circuitry 50 and servo system 52.

Having described the disk drive 20, the writing of servo tracks on the first and second surfaces 24A, 24B of the disk 22 is described. Initially, measurements are taken that provide a basis for determining the desirable or optimal TPI for each surface. Among the possible measurements are the read head width, i.e., the width of the track established by a read head or a read/write head when in the read mode of operation. Other possible measurements include the write head width and off-track performance based upon bit error rate and/or the read channel quality factor (which are typically shown in what are known as "bathtub" and "747" curves).

Figure 4:
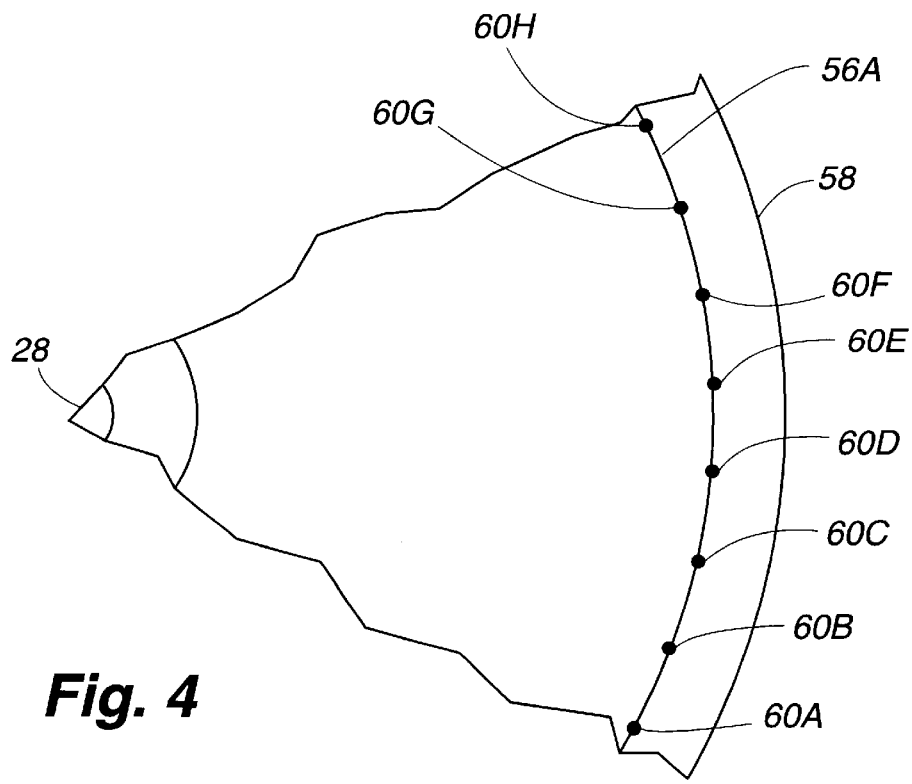
FIG. 4 illustrates the initial servo track written on a disk.
Figure 5:
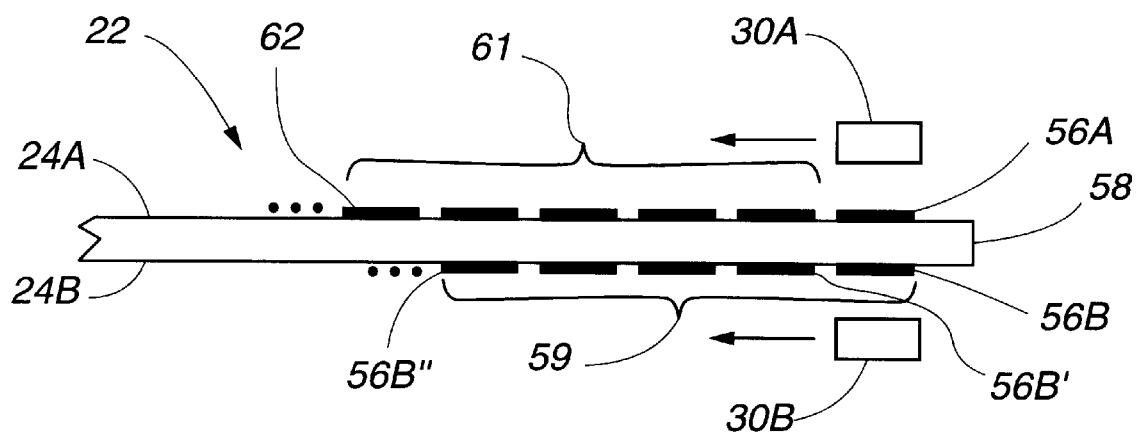
FIG. 5 illustrates the self writing of servo tracks on the first and second surfaces of a disk with the TPI on the first surface of the disk being different than the TPI on the second surface of the disk.

Once the TPI for each surface has been determined, the servo tracks are written on the first and second surfaces 24A, 24B with the desired TPIs using either a servo track writer or self servo writing. In the case of self servo track writing, operation commences with the receipt of a command from an exterior device, such as a microprocessor, at the interface 48 directing the disk drive 20 to perform the self servo writing operation. In response to the command, the controller 54 directs the servo system 52 to position the primary actuator 34 against the crash stop 43 for writing the initial servo track 56A (FIG. 4) on the first surface 24A of the disk 22 and adjacent to the edge 58 of the disk 22. By positioning the primary actuator 34 against the crash stop 43, any positional error in the initial servo track 56A is substantially reduced, i.e., the end of the track should meet the start of the track with little, if any, radial offset. This, in turn, reduces any positional error in the servo tracks that are subsequently written on the disk 22, the quality of which is dependent upon the initial servo track 56A. The controller 54 also directs the servo system 52 to cause the secondary actuator 44A to position the head 30A for writing the initial servo track 56A on the first surface 24A of the disk 22. Likewise, the controller 54 causes the head 30B to be positioned with the secondary actuator 44B for writing the initial servo track 56B on the second surface 24B of the disk 22 (FIG. 5).

Once the first head 30A has been positioned, the controller 54 causes the servo data for the initial servo track 56A to be transferred from the servo pattern generator 49 to the first head 30A for writing on the disk. The content and the location of the servo data in the initial servo track 56A is dependent upon the particular servo mechanisms being implemented in the drive. In one embodiment, the servo data is in the form of servo sectors that are typically located at positions 60A–60H that are regularly spaced from one another. In one embodiment, the servo sectors for a servo track include an index that defines the beginning of the track, a track address, a segment addresses (i.e., a portion of the track), and data (i.e., servo bursts) that can be used to facilitate the following of the track. Included in the servo data of the initial servo track is a clock or timing signal. The clock signal is used by the servo system 52 to locate each servo sector along the track. In particular, the clock signal provides pulses or cycles that can be counted and the count used to establish predetermined spacing between the servo sectors in a servo track.

Once the initial servo track 56A has been written and the second head 30B positioned for writing the initial servo track 56B on the second surface 24B of the disk 22, the controller 54 causes the servo data from the initial servo track 56A to be read and used by the servo system 52 so that the first head 30A tracks or follows the initial servo track 56A. By having the first head 30A follow the initial servo track 56A and by maintaining the position of the second head 30B relative to the first head 30A, the second head 30B follows a path over the second surface 24B that substantially mirrors the initial servo track 56A. In addition, the controller 54 causes the clock or timing signal from the initial servo track 56A to be used to establish the desired spacing between the servo sectors of the initial servo track 56B. The controller 54 also causes the servo data for the initial servo track 56B to be transferred from the servo pattern generator 49 to the second head 30B for writing on the disk and thereby establish the servo track 56B on the second surface 24B of the disk 22.

In one embodiment, the servo data in servo track 56A is used as a reference to write not only the initial servo track 56B but also several other servo tracks on the second surface 24B of the disk 22. In this case, once the initial servo track 56B has been written, the controller 54 causes the servo system 52 to use the secondary actuator 44B to adjust the position of the second head 301B for writing the next servo track 56B' on the second surface of the disk with the desired TPI. This process is typically repeated to establish a group of servo tracks 59 on the second surface 24B of the disk with the specified TPI. For a given position of the primary actuator 34, the number of servo tracks that can be established on the second surface 24B is limited to the point or close to the point at which the multi-stage actuator 32 is incapable of adequately tracking the initial servo track 56A and using the information from the initial servo track 56A as a reference for writing servo tracks on the second surface 24B of the disk 22. Generally, this occurs, for a given position of the primary actuator 34, when the secondary actuator 44A is at or near the limit of its motion in one radial direction and the secondary actuator 44B is at or near the limit of its motion in the opposite radial direction.

At this point, one of the servo tracks established on the second surface 24B of the disk 22 needs to be used as a reference to write further servo tracks on the first surface 24A of the disk 22 with the desired TPI, which may be different than the TPI of the servo tracks that have been established on the second surface 24B. Typically, the last servo track 56B" written on the second surface 24B is the furthest from the edge 58 and is used as the reference for writing further servo tracks on the first surface 24A of the disk 22. Since the servo track 56B" is going to be used as a reference, the track includes the clock signal that is used to position the servo sectors during the writing of the additional servo tracks on the first surface 24A of the disk 22. It should, however, be appreciated that any of the servo tracks established on the second surface 24B can be used as the reference provided the servo track includes the clock signal. In any event, the controller 54 causes the process to be repeated to write a group of servo tracks 61 on the first surface 24A of the disk 22 with the desired TPI. Specifically, the servo data from the servo track 56B" on the second surface 24B of the disk 22 is used by the servo system 52 to maintain the position of the second head 30B over the servo track 56B", the secondary actuator 44A positions the first head 30A over the first surface 24A to establish the group of servo tracks 61 on the first surface 24A of the disk 22 with the appropriate TPI for the first surface 24A. The group of servo tracks 61 contains the same number of servo tracks as the group of servo tracks 59. In addition, the group of servo tracks 61 includes servo track 62. After the primary actuator 34 has been repositioned to write a new band of servo tracks, the servo track 62 is used to write a second band of servo tracks on the second surface 24B in the same manner that the initial track 56A was used in writing the first band of servo tracks on the second surface 24B. Consequently, servo track 62 includes the clock signal. Likewise, while primary actuator 34 remains in a fixed position (except for track following adjustments), one of the servo tracks in the second band of servo tracks on the second surface 24B that includes the clock signal is then used to write another band of servo tracks on the first surface 24A in the same manner that servo track 56B" was used to write servo tracks on the first surface 24A.

Once all of the servo tracks have been written on the first and second surfaces 24A, 24B of the disk 22 for a given position of the primary actuator 34, the controller 54 causes the primary actuator 34 to be repositioned and the process is repeated. By using the last servo track written on the first surface 24A of the disk 22 (i.e., the servo track 62), repositioning of the primary actuator 34 is substantially reduced, thereby reducing a potential source of error. The controller 54 causes the servo track writing process of using a reference on one surface of the disk 22 to facilitate the writing of servo tracks on the other surface of the disk 22 in an alternating manner to continue until all of the servo tracks have been established on both surfaces 24A, 24B of the disk 22.

After all of the servo sectors have been established on the first and second surfaces 24A, 24B of the disk 22, the clock or timing signal is no longer needed to establish desired spacing between the servo sectors. Consequently, the clock or timing signal present between the servo sectors can be overwritten with user data.

As an alternative to self servo writing, the servo tracks can be written with the use of a servo track writer. In this case, the push-pin of the servo track writer (rather than the actuator motor) is used to establish the position of the primary actuator 34. Further, the servo pattern generator used to produce the servo data is within the servo track writer rather than the disk drive 20, and thus, the disk drive 20 need not include servo pattern generator 49. Otherwise, the process for writing the servo tracks is substantially identical to that described in the self servo writing method.

All of the servo tracks on first and second surfaces 24A and 24B of the disk 22 can be coincident with user data tracks. Alternatively, some of the servo tracks (e.g., tracks 56A and 56B) closest to edge 58 of disk 22 can be outside the data regions of first and second surfaces 24A and 24B that contain the user data tracks, in which case these servo tracks will contain exclusively servo information.

The invention is applicable or adaptable to disk drives in which: (1) there are two or more heads associated with a single surface of a disk and secondary actuators are associated with two or more of the heads; (2) there are two or more heads associated with disk surfaces that are, in turn, associated with different disks within the drive; (3) there are two or more primary actuators, rather than the single primary actuator described above; (4) a primary actuator is utilized that moves a head in a linear manner; (5) a secondary actuator is employed that moves a head in a linear manner; (6) primary and secondary actuators are utilized that involve combinations of rotary and linear actuators; (7) the servo track data is received from the exterior environment; (8) the servo tracks are written away from the center of the disk(s) rather than towards the center of the disk(s); (9) the servo tracks are written out of sequence; (10) only one servo track is written on a surface of a disk at a time; (11) the device 46 that cooperates with the multi-stage actuator to write the servo tracks is a separate device from the device used to write and/or read user data on the disk(s); and (12) a multi-stage actuator is employed that has more than two stages.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described above is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A disk drive, comprising:
   first and second disk surfaces that are substantially parallel with and spaced from one another;
   first and second heads for transferring data to and from the first and second disk surfaces, respectively;
   a multi-stage actuator that includes a primary actuator for positioning the first and second heads, a first secondary actuator for positioning the first head, and a second secondary actuator for positioning the second head; and
   a data transfer device that causes the first head to write first servo tracks to the first disk surface with a first TPI format and the second head to write second servo tracks to the second disk surface with a second TPI format, wherein the first head writes at least two of the first servo tracks to the first disk surface while the primary actuator is maintained at a fixed position, and the second head writes at least two of the second servo tracks to the second disk surface while the primary actuator is maintained at a fixed position.

2. The disk drive of claim 1, wherein the first and second TPI formats are based on measured physical characteristics of the first and second heads, respectively.

3. The disk drive of claim 1, wherein the first and second TPI formats are based on measured off-track performance of the first and second heads, respectively.

4. The disk drive of claim 1, wherein the first head w rite s all servo tracks written to the first disk surface.

5. The disk drive of claim 1, wherein the second head writes all servo tracks written to the second disk surface.

6. The disk drive of claim 1, wherein the first head writes at least one of the first servo tracks to the first disk surface while the primary actuator positions the first head in response to a physical reference in the disk drive.

7. The disk drive of claim 6, wherein the physical reference is a crash stop.

8. The disk drive of claim 6, wherein the first and second heads write all servo information written to the first and second disk surfaces, respectively, without a servo track writer exterior to the disk drive.

9. The disk drive of claim 1, wherein the first head reads and writes all servo information and user data that is written to and read from the first disk surface, and the second head reads and writes all servo information and user data that is written to and read from the second disk surface.

10. The disk drive of claim 1, wherein the first and second disk surfaces are opposing surfaces of a single magnetic disk.

11. A method of servo track writing in a disk drive, comprising:

providing first and second disk surfaces;

providing first and second heads for transferring data to and from the first and second disk surfaces, respectively;

providing a multi-stage actuator that includes a primary actuator for coarsely positioning the first and second heads, a first secondary actuator for finely positioning the first head, and a second secondary actuator for finely positioning the second head;

determining a first TPI format using a first measured characteristic of the first head;

determining a second TPI format using a second measured characteristic of the second head;

writing first servo tracks from the first head to the first disk surface using the first TPI format, wherein the first head writes at least two of the first servo tracks to the first disk surface while the primary actuator is maintained at a fixed position; and writing second servo tracks from the second head to the second disk surface using the second TPI format, wherein the second head writes at least two of the second servo tracks to the second disk surface while the primary actuator is maintained at a fixed position.

12. The method of claim 11, wherein the first measured characteristic is a read width of the first head, and the second measured characteristic is a read width of the second head.

13. The method of claim 11, wherein the first measured characteristic is a write width of the first head, and the second measured characteristic is a write width of the second head.

14. The method of claim 11, wherein the first measured characteristic includes a read width and write width of the first head, and the second measured characteristic includes a read width and a write width of the second head.

15. The method of claim 11, wherein the first measured characteristic is an off-track performance of the first head, and the second measured characteristic is an off-track performance of the second head.

16. The method of claim 15, wherein the off-track performance of the first head is determined measuring a first bit error rate, and the off-track performance of the second head is determined measuring a second bit error rate.

17. The method of claim 15, wherein the off-track performance of the first head is determined measuring a first read channel quality factor, and the off-track performance of the second head is determined measuring a second read channel quality factor.

18. The method of claim 11, including writing at least one of the first servo tracks while the multi-stage actuator uses a physical reference in the disk drive to position the first head.

19. The method of claim 18, wherein the physical reference is a crash stop.

20. The method of claim 11, wherein the first and second disk surfaces are opposing surfaces of a single magnetic disk.

21. A method of servo track writing in a disk drive, comprising:

providing a disk with first and second disk surfaces;

providing first and second heads for transferring data to and from the first and second disk surfaces, respectively;

providing a multi-stage actuator that includes a primary actuator for positioning the first and second heads, a first secondary actuator for positioning the first head without positioning the second head, and a second secondary actuator for positioning the second head without positioning the first head;

providing a first TPI format based on a first measured characteristic associated with the first head;

providing a second TPI format based on a second measured characteristic associated with the second head;

using the first head to write first servo tracks with the first TPI o the first disk surface, wherein the first head writes at least two of the first servo tracks on the first disk surface while the primary actuator is maintained at a fixed position; and using the second head to write second servo track with the second TPI format on the second disk surface, wherein the second head writes at least two of the second servo tracks on the second disk surface while the primary actuator is maintained at a fixed position.

22. The method of claim 21, wherein the first measured characteristic is a read width of the first head, and the second measured characteristic is a read width of the second head.

23. The method of claim 21, wherein the first measured characteristic is a write width of the first head, and the second measured characteristic is a write width of the second head.

24. The method of claim 21, wherein the first measured characteristic includes a read width and write width of the first head, and the second measured characteristic includes a read width and a write width of the second head.

25. The method of claim 21, wherein the first measured characteristic is an off-track performance of the first head, and the second measured characteristic is an off-track performance of the second head.

26. The method of claim 25, wherein the off-track performance of the first head is determined measuring a first bit error rate, and the off-track performance of the second head is determined measuring a second bit error rate.

27. The method of claim 25, wherein the off-track performance of the first head is determined measuring a first read channel quality factor, and the off-track performance of the second head is determined measuring a second read channel quality factor.

28. The method of claim 21, including writing at least one of the first servo tracks while the multi-stage actuator uses a physical reference in the disk drive to position the first head.

29. The method of claim 28, wherein the physical reference is a crash stop.

30. The method of claim 21, wherein the first and second disk surfaces are opposing surfaces of a single magnetic disk.

31. A method for servo track writing in a disk drive that includes: (a) a first disk surface for storing data; (b) a second disk surface for storing data; (c) wherein the first disk surface is separated from and substantially parallel to the second disk surface; (d) wherein the first and second disk surfaces have substantially the same radius and, during operation, rotate about a common axis; (e) a first head for transferring data to and from the first disk surface; (f) a second head for transferring data to and from the second disk surface; (g) a multi-stage actuator for positioning the first and second heads at desired locations over the first and second disk surfaces; (h) wherein the multi-stage actuator includes a primary actuator for simultaneously moving the first and second heads; and (i) wherein the multi-stage actuator includes a first secondary actuator for moving the first head without moving the second head and second secondary actuator for moving the second head without moving the first head, the method comprising:

(1) measuring a first characteristic of the first head
(2) measuring a second characteristic of the second head;
(3) determining a first TPI format based on the first characteristic;
(4) determining a second TPI format based on the second characteristic;
(5) writing a plurality of first servo tracks from the first head to the first disk surface using the primary actuator and the secondary actuator to position the first head to provide the first servo tracks with the first TPI format; and
(6) writing a plurality of second servo tracks from the second head to the second disk surface using the primary actuator and the second secondary actuator to position the second head to provide the second servo tracks with the second TPI format, wherein writing the first and second servo tracks occurs in an interleaved manner at separate times.

32. The method of claim 31, wherein the first disk surface includes first user data tracks within a first data storage region and at least one of the first servo tracks is outside the first data storage region.

33. The method of claim 32, wherein the second disk surface includes second data tracks within a second data storage region and at least one of the second servo tracks is outside the second data storage region.

34. The method of claim 33, wherein at least one of the first servo tracks is coincident with at least one of the first user data tracks.

35. The method of claim 34, wherein at least one of the second servo tracks is coincident with at least one of the second user data tracks.

36. The method of claim 31, wherein at least one of the first servo tracks is coincident with a first user data track on the first disk surface.

37. The method of claim 36, wherein at least one of the second servo tracks is coincident with a second user data track on the second disk surface.

38. The method of claim 31, wherein at least one the first servo tracks includes servo data used to generate a clock signal that provides predetermined spacings between servo sectors on at least one of the second servo tracks, and at least one of the second servo tracks includes servo data used to generate a clock signal that provides predetermined spacings between servo sectors on at least one of the first servo tracks.

39. The method of claim 31, wherein step (5) is performed using a crash stop to position the primary actuator during writing at least one of the first servo tracks.

40. The method of claim 31, wherein steps (5) and (6) are performed without a servo track writer exterior to the disk drive.

41. A method for performing variable tracks-per-inch (TPI) servo track writing in a disk drive that includes: (1) a first disk surface for storing data; (2) a second disk surface for storing data; (3) wherein the first disk surface is separated from and substantially parallel to the second disk surface; (4) wherein the first and second disk surfaces have substantially the same radius and, during operation, rotate about a common axis; (5) a first head for use in transferring data between the first disk surface and an exterior environment; (6) a second head for use in transferring data between the second disk surface and the exterior environment; (7) a multi-stage actuator for positioning the first and second heads at desired locations over the first and second disk surfaces; (8) wherein the multi-stage actuator includes a primary actuator for simultaneously moving the first and second heads; and (9) wherein the multi-stage actuator includes a first secondary actuator for moving the first heads and a second secondary actuator for moving the second head, the method comprising:

(1) determining a first TPI format for the first head and a second TPI format for the second head;
(2) using the primary actuator to position the first and second heads; and
(3) using the first secondary actuator to write servo tracks on the first disk surface with the first TPI and the second secondary actuator to write servo tracks on the second disk surface with the second TPI such that the servo tracks are written to the first and second disk surfaces in an interleaved manner at separate times.

42. The method of claim 41, wherein step (1) includes measuring at least one of the following: (a) a read width for the first and second heads; and (b) a write width for the first and second heads.

43. The method of claim 41, wherein step (1) includes measuring an off-track performance of the first and second heads.

44. The method of claim 43, wherein measuring the off-track performance includes using at least one of the following: (a) a bit error rate; and (b) a read channel quality factor.

45. The method of claim 44, wherein measuring the off-track performance includes using at least one of the following: (a) a "bathtub" curve; and (b) a "747" curve.

46. The method of claim 41, wherein step (2) includes employing a servo track writer exterior to the disk drive to move the primary actuator.

47. The method of claim 41, wherein step (2) includes employing an actuator motor within the disk drive to move the primary actuator.

48. The method of claim 41, wherein step (2) includes positioning the primary actuator against a crash stop.

49. The method of claim 41, wherein the first head writes all servo information that is written to the first disk surface, and the second head writes all servo information that is written to the second disk surface.

50. The method of claim 41, wherein the first and second disk surfaces are opposing surfaces of a single magnetic disk.

51. A method for servo track writing in a disk drive that includes: (a) a first disk surface for storing data; (b) a second disk surface for storing data; (c) wherein the first disk surface is separated from and substantially parallel to the second disk surface; (d) wherein the first and second disk surfaces have substantially the same radius and, during operation, rotate about a common axis; (e) a first head for transferring data between the first disk surface and an exterior environment; (f) a second head for transferring data between the second disk surface and the exterior environment; (g) a multi-stage actuator for positioning the first and second heads at desired locations over the first and second disk surfaces; (h) wherein the multi-stage actuator includes a primary actuator for simultaneously moving the first and second heads; and (i) wherein the multi-stage actuator includes a first secondary actuator for moving the first head and a second secondary actuator for moving the second head, the method comprising:

(a) determining a first TPI format for the first disk surface and a second TPI format for the second disk surface;

(b) setting x=1;

(c) setting y=1 and z=1;

(d) positioning the primary actuator at a location x;

(e) using the first secondary actuator to position the first head to write servo track y at radial location y on the first disk surface;

(f) writing servo track y at the radial location y on the first disk surface with the first TPI format;

(g) using the first head to read the servo track y on the first disk surface;

(h) using the second secondary actuator to position the second head to write servo track z at radial location z on the second disk surface;

(i) writing servo track z at the radial location z on the second disk surface with the second TPI format;

(j) determining if z is less than or equal to a first predetermined number;

(k) if z is less than or equal to the first predetermined number, then incrementing z, using the second secondary actuator to position the second head to write servo track z at radial location z on the second disk surface, writing servo track z at radial location z on the second surface with the second TPI format, and repeating step (j);

(l) if z is equal to the first predetermined number, then incrementing y and determining if y is less than or equal to a second predetermined number;

(m) if y is less than or equal to the second predetermined number, then using the first secondary actuator to position the first head to write servo track y at radial location y on the first disk surface, and writing servo track y at radial location y on the first disk surface with the first TPI format;

(n) if y is equal to the second predetermined number, incrementing x and determining if x is less than or equal to a third predetermined number;

(o) if x is less than or equal to the third predetermined number, then repeating steps (c) through (n); and (p) if x is greater than the third predetermined number, then stopping the servo track writing.

52. The method of claim 51, wherein when x=1, the step of positioning the primary actuator at location x is determined by a crash stop.

53. The method of claim 51, wherein at least one of the first predetermined number and second predetermined number is greater than 1.

54. The method of claim 51, wherein both of the first predetermined number and the second predetermined number are greater than 1.

55. The method of claim 54, wherein the first predetermined number is equal to the second predetermined number.

56. The method of claim 54, wherein the first predetermined number and the second predetermined number have a difference of one.

57. The method of claim 51, wherein at least one of the first predetermined number and the second predetermined number is 1.

58. The method of claim 51, wherein the first predetermined number and the second predetermined number are both 1.

59. The method of claim 51, wherein positioning the primary actuator includes using an actuator motor within the disk drive without a servo track writer exterior to the disk drive.

60. The method of claim 51, wherein positioning the primary actuator includes using a crash stop within the disk drive.

\* \* \* \* \*